Oct. 10, 1967  R. W. BLATT ET AL  3,346,713
ELECTRICAL DISCHARGE MACHINING DIELECTRIC COOLANT
Filed July 19, 1963
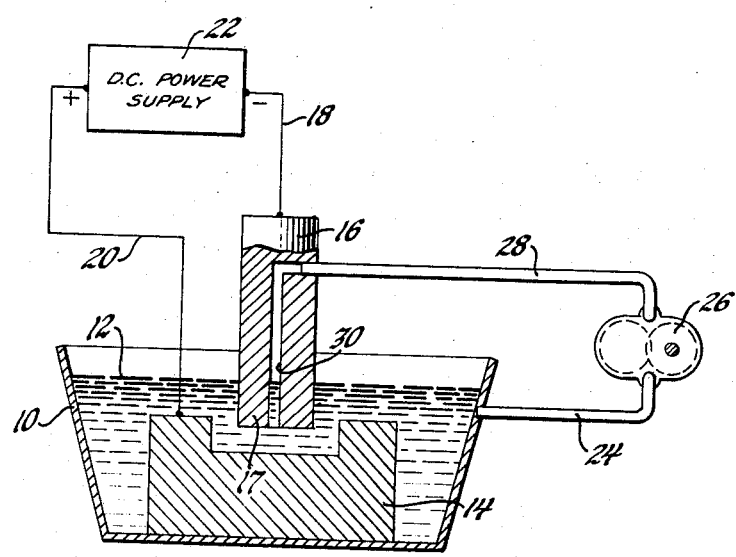
INVENTORS
Rudolph W. Blatt &
BY Charles F. Froberger
ATTORNEY

United States Patent Office 3,346,713
Patented Oct. 10, 1967

3,346,713
ELECTRICAL DISCHARGE MACHINING DIELECTRIC COOLANT
Rudolph W. Blatt, Warren, and Charles F. Froberger, Mount Clemens, Mich., assignors to General Motors Corporation, Detroit, Mich., a corporation of Delaware
Filed July 19, 1963, Ser. No. 296,265
15 Claims. (Cl. 219—69)

ABSTRACT OF THE DISCLOSURE

The method of electrical discharge machining which comprises causing intermittent electrical discharges across the gap between an electrode and a workpiece while maintaining in said gap a dielectric fluid. The fluid consists essentially of a mixture of polycyclic aromatic compounds (i.e., fused and/or isolated ring) which have an overall carbon-to-hydrogen ratio of about 0.8 to about 1.8. The polycyclic aromatic compounds are preferably derived from the fractional distillation of coal tar and have boiling points in the temperature range of about 408–745° F. Mixtures boiling between about 491–513/ F. are particularly beneficial.

---

This invention relates generally to electrical discharge machining, which is sometimes referred to as "spark-machining," "electrospark-machining," or EDM. More particularly, this invention relates to polycyclic organic dielectric fluids or coolants for use in EDM processes.

As is well known in the art, EDM is normally carried on by passing a series of short duration, high frequency electrical discharges across a gap from a cathodic electrode to a conductive anodic workpiece in the presence of a dielectric fluid or coolant which is circulated in the gap. During the machining process both the cathode and the anode are eroded or worn. Of course, in EDM, it is desirable to have a high workpiece-to-electrode wear ratio, since a high ratio is indicative of increased machining efficiency.

It is generally believed that melting is the basic mechanism involved in the EDM process by which both the anodic workpiece and the cathodic electrode are eroded. The bombarding electrons in each electrical discharge from the cathode generate sufficient heat to melt or vaporize the metallic surface of the anode at the area of impact, thereby forming a small diameter pit or crater in the surface of the workpiece.

It is well known in the art that electrical discharges occur between different areas of the cathodic electrode and anodic workpiece as the machining progresses. Several successive discharges may take place in rapid order between the same areas of the workpiece and electrode, and then the discharge path may move to remote spots on the electrode and workpiece and subsequently to other spots. In other words, a single discharge never takes place over the entire face of the cathodic electrode or anodic workpiece but is represented by continuously moving points on the surfaces of the electrode and workpiece with each successive discharge. This phenomenon it attributed to the variable dielectric of the gap resulting from erosion of the workpiece and electrode, accumulation of sludge in the gap and nonuniformity of the coolant dielectric strength.

As previously mentioned, successive discharges melt or vaporize the metal surface of the anodic workpiece being machined to form a series of craters or pits therein, thereby eroding a portion of the workpiece into conformance with the general shape of the operative portion of the cathodic electrode. Naturally, the size, depth and proximity of the craters formed in the workpiece will affect the smoothness of its surface. Deeper craters tend to produce a rougher surface finish because of the greater distances between peaks, and valleys on the machined surface of the workpiece. However, tests have shown that this effect can be compensated for by causing the discharges to take place in close proximity to one another to form overlapping craters. When there is a substantial degree of overlap between adjacent craters, the distances between the peaks and valleys on the surface of the workpiece is reduced and a relatively smooth surface finish is obtained. Moreover, it has been found that the number of craters which are overlapped is greater when relatively small diameter craters are formed.

When the bombarding electrons diffuse outwardly along the discharge path, the craters tend to be shallow, wider and farther apart, resulting in a relatively rough surface finish on the workpiece. Theferore, by confining the flow of the bombarding electrons to a relatively narrow spark channel or discharge path across the gap, small diameter, more closely spaced, overlapping craters are formed, resulting in a comparatively smooth surface finish on the portion of the workpiece being machined.

More importantly, it has been found that the metal removal rate from the surface of the anodic workpiece is greatly increased if the electrons in each discharge and more concentrated in a narrow path or channel. A concentrated discharge will form a deeper crater and remove more metal from the anodic workpiece than a diffused discharge which forms a relatively shallow crater. This increase in the anode consumption rate is attributed to the fact that a more concentrated discharge melts more metal on impact, since a larger portion of the anodic workpiece is raised to the melting point of the metal rather than merely being heated as in the case of the diffused discharge.

Thus, higher erosion rates and machining efficiency may be obtained by preventing the electrons in each discharge from diffusing or "fanning out" when they traverse the gap from the cathodic electrode to the anodic workpiece. The degree of diffusion of the electrons along the discharge path depends to a large extent on the physical and chemical characteristics of the dielectric fluid or coolant which is circulated in the gap between the cathode and the anode.

Organic hydrocarbon dielectric fluids, such as kerosene or various aliphatic hydrocarbons, are widely used as coolants in EDM machining because of their relatively good dielectric properties and comparatively low cost. Petroleum fractions consisting essentially of monocyclic aromatic hydrocarbons, such as alkyl benzenes, also have been used as dielectric coolants in EDM processes. However, we have found that the above dielectric coolants have certain inherent deficiencies when used in an EDM process, as will hereinafter be more fully explained.

When a sufficiently high voltage is impressed across the gap between the cathodic electrode and anodic workpiece to cause an electrical discharge to traverse the gap, the molecules of an organic dielectric fluid will break down to form a plasma of ionized particles in the gap. This plasma serves to conduct the electrons of the electrical discharge across the gap. Thus, when a hydrocarbon dielectric fluid is employed in an EDM process, the hydrocarbon molecules break down to form hydrogen gas and hydrogen ions in the discharge path. Of course, in addition to hydrogen gas, other gases such as methane and ethane may also be formed when the hydrocarbon molecules break down in an EDM process. The amount and type of these other gases which are formed depend to a large extent on the type of hydrocarbon dielectric fluid being used and the EDM process conditions employed. However, since in most cases involving the use of an organic dielectric fluid, hydrogen is the primary gas constituent which is formed, the discussion in this application will be limited to the effect of hydrogen gas formation on EDM performance. The effect of the formation of other gases on EDM performance is analogous to that of hydrogen.

The hydrogen gas tends to diffuse the bombarding electrons in the discharge path. In other words, this hydrogen gas has a tendency to disperse the plasma, making a wider spark channel in the gap which results in the diffusion of electrons along the discharge path. As previously mentioned, the diffusion of electrons in each electrical discharge of an EDM process results in a relatively low workpiece metal removal rate and a relatively rough finish on the surface of the workpiece being machined.

Since the molecules of aliphatic hydrocarbon fluids and kerosene have a large number of hydrogen atoms, they tend to generate considerable quantities of hydrogen gas and hydrogen ions on chemical breakdown in an EDM process, thereby causing the electrical discharge to diffuse. While the molecules of monocyclic aromatic hydrocarbon fluids have a smaller number of hydrogen atoms in each molecule, they still contain a sufficient number of hydrogen atoms to generate considerable quantities of hydrogen gas and hydrogen ions on chemical breakdown in an EDM process. Therefore, it is desirable to provide an EDM organic dielectric fluid in which the molecules have an even smaller number of hydrogen atoms to reduce generation of hydrogen gas and hydrogen ions on chemical breakdown in an EDM process. A dielectric fluid which generates a minimum amount of hydrogen gas and hydrogen ions will decrease the diffusion of the electrons in the discharge, thereby providing a more concentrated electrical discharge. Thus, the workpiece metal removal rate may be increased and a smoother surface may be formed on the portion of the workpiece being machined by an EDM process.

Moreover, as previously mentioned, the cathodic electrode is also worn during the EDM process by a melting process. This effect is partially attributed to the bombardment of the cathode by the hydrogen ions released from the hydrocarbon fluid and the metal ions released from the surface of the anodic workpiece. When these positively charged particles impinge on the surface of the cathodic electrode at high velocity, they melt or vaporize its surface, thereby causing erosion of the cathode. Thus, it will be seen that the anode-to-cathode wear ratio may be improved by providing a dielectric fluid which minimizes the formation of hydrogen ions on chemical breakdown of the fluid, since fewer hydrogen ions are available to erode the cathodic electrode. However, as previously mentioned, most aliphatic and monocyclic aromatic hydrocarbon fluids generate a substantial quantity of hydrogen ions on chemical breakdown in an EDM process.

In most commonly used EDM processes the dielectric fluid or coolant is circulated through the gap to cool the cathodic element and anodic workpiece and to remove the metal particles eroded therefrom. Therefore, it is desirable that the dielectric fluid in the gap have a sufficiently low viscosity at the operating temperature range of the EDM process to facilitate the circulation of the fluid through the gap. Also, it is desirable to employ a dielectric fluid having a low vapor tension to minimize the formation of gas pockets, such as accumulations of hydrogen gas, in the fluid. In addition, the fluid preferably should be relatively innocuous and comparatively inexpensive to use. Naturally, the fluid also should have reasonably good dielectric properties.

Therefore, it is a principal object of the present invention to provide a dielectric fluid which will improve the workpiece metal removal rate and increase the workpiece-to-cathodic electrode wear ratio in an EDM process.

It is another object of the present invention to provide a method for electrical discharge machining of a workpiece to form a relatively smooth surface finish on the machined portion of the workpiece.

It is a further object of the present invention to provide a satisfactory dielectric fluid which has a relatively low viscosity to facilitate circulation of the fluid in the gap.

In accordance with the present invention, these and other objects are attained by using a dielectric coolant bath in an EDM process wherein the bath has an overall carbon atom-to-hydrogen atom ratio of about 0.8 to about 1.8 and consists essentially of polycyclic organic compounds such as fused ring organic compounds and/or other polycyclic aromatic compounds or mixtures thereof. In this application, by the term "mixture" we mean to include solutions of various compatible polycyclic organic compounds wherein the overall carbon-to-hydrogen atomic ratio of the mixture is within the aforementioned range. Since the number of bonded hydrogen atoms present in polycyclic organic molecules is substantially less than the number of bonded hydrogen atoms in molecules of aliphatic hydrocarbons and monocyclic aromatic hydrocarbons, smaller amounts of hydrogen gas and hydrogen ions are released from the former molecules on chemical breakdown in an EDM process so that the anode-to-cathode wear ratio and the rate of metal removal from the workpiece are increased, and the surface finish of the workpiece is improved.

Other features and advantages of the present invention will be apparent from the following detailed description of certain embodiments thereof taken in conjunction with the accompanying drawing containing a diagrammatic view, partly in section and partly in elevation, illustrating an EDM apparatus which may be used with the novel liquid dielectric fluids embodying the present invention.

Referring more particularly to the drawing, the apparatus includes a receptacle 10 which serves as a reservoir for holding the liquid dielectric coolant bath 12. An electrically conductive metal workpiece 14 made of steel or other suitable metal is most advantageously located in the receptacle so that the surface of the workpiece being machined is covered by the bath. An electrode or cathode 16 made of a conductive metal, such as copper, is held in position above the surface of the workpiece by any suitable means, not shown in the drawing, so that an appropriate gap may be maintained between the operative end 17 of the cathode and the workpiece during the machining process. Of course, as is well known in the art, the cathode 16 is continually fed toward the workpiece during the machining process to maintain the proper gap spacing, since the cathode and anodic workpiece are continually eroded by the melting process previously described. The cathodic electrode and anodic workpiece may be connected by electrical lead wires 18 and 20 to the negative and positive terminals, respectively, of a suitable direct current power supply 22 which generates the electrical discharges across the gap to machine the workpiece.

As previously mentioned, the liquid dielectric fluid or coolant preferably is continually circulated through the gap during the machining process to remove the metal particles eroded from the workpiece and the cathode. This may be accomplished by providing a pipe or tube 24 between the receptacle 10 and a suitable pump 26 which draws the fluid from the receptacle through the tube 24 and returns it under pressure through another tube 28 into a narrow passage 30 provided in the cathode. The fluid is then directed through the passage 30 and out of the lower operative end 17 of the cathode into the gap.

Thus, the dielectric fluid may be continually circulated through the gap during the machining process. The eroded metal particles entrained in the circulating fluid may be removed from the coolant by any suitable means, not shown in the drawing.

We have found that distillation fractions of coal tar consisting essentially of fused ring organic compounds and or other polycyclic organic compounds, such as polycyclic aromatic compounds are suitable for use as EDM fluids or coolants in accordance with the present invention. Preferably, these compounds have boiling points in a temperature range of about 392° F. to about 842° F. Specifically, a dielectric bath composed of any one of these compounds or mixtures thereof must have an overall carbon-to-hydrogen atom ratio between about 0.8 to 1.8 unless these compounds or mixtures thereof are used as additives in other dielectric fluids, as will hereinafter be more fully explained. Particularly satisfactory results have been obtained with coal tar fractions of which the various components have boiling points within a temperature range of about 408° F. to about 745° F. These fractions include fused ring organic and other polycyclic organic compounds such as methyl phenanthrene, phenanthrene, anthracene, phenylnaphthalene, naphthalene, acridine, diphenyl, methyl quinolines and many other related coal tar distillation products.

Preferably, the coal tar fractions of the present invention are liquid at room temperature to facilitate the circulation of the EDM fluids through the gap between the cathode and the workpiece. Hence, these fluids or coolants may have a viscosity ranging from about 1.0 centistokes to about 100 centistokes at 70° F., the preferred range being from about 1.5 centistokes to about 30 centistokes at 70° F. Also, since the preferred coal tar fractions have a relatively low vapor tension, the accumulation of gas in the coolant bath is minimized, thereby providing an important advantage of the present invention.

In accordance with the present invention, it will be appreciated that the EDM dielectric bath may comprise one or another of the individual fused ring organic compounds and polycyclic organic compounds disclosed or mixtures thereof, provided the overall carbon-to-hydrogen atomic ratio of the dielectric bath is within the aforementioned range. Similarly, as will hereinafter be more fully explained, it is within the intended scope of the present invention to include EDM fluids formed by adding small quantities of other compatible organic materials containing bonded oxygen, chlorine, nitrogen, sulfur, etc., to the aforementioned polycyclic organic compounds. Also, EDM dielectric fluid mixtures which are formed by adding the polycyclic organic compounds of the present invention to other types of EDM fluids, such as kerosene, monocyclic aromatic hydrocarbons and aliphatic hydrocarbons, to improve the performance of the latter fluids are within the intended scope of the present invention.

By way of illustration, we have listed below specific examples of coal tar fractions consisting essentially of polycyclic organic compounds that may be satisfactorily used as EDM dielectric fluids in accordance with the present invention to achieve the aforementioned improvements in metal removal rate, surface finish and wear ratio.

For example, we have found that a coal tar derivative product commercially marketed by Reilly Tar and Chemical Company under the trade name of Reilly Arcut Plasma A having an average carbon-to-hydrogen atomic ratio of about 1.35 provides satisfactory results in accordance with the present invention. This liquid coal tar derivative product is composed of a mixture of various polycyclic organic compounds which boil in a temperature range of about 644° F. to about 745° F. The major components in this distillation range include 9-methyl phenanthrene, 1-methyl phenanthrene and 2-phenylnaphthlene. Also present are minor amounts of other less viscous components, such as phenanthrene and anthracene, which serve to reduce the viscosity of the fluid to about 25.0 centistokes at 70° F. The specific gravity of this fluid is about 1.18 at 70° F.

Another example of a coal tar derivative product which provides particularly satisfactory results in accordance with the present invention is commercially marketed under the trade name Reilly Arcut Plasma B. This product is composed of a mixture of coal tar crude oil distillation compounds which have boiling points between about 408° F. and about 666° F. The distillation compounds contained in this fluid are primarily polycyclic organic compounds, the mixture of which has an average carbon-to-hydrogen atomic ratio of about 1.21. An approximate chemical analysis of Reilly Arcut Plasma B fluid is listed in Table I below:

TABLE I

| Compound: | Percentage, by weight |
|---|---|
| Naphthalene | 5 |
| Mixed xylenols | 10 |
| Quinoline | 2 |
| Methyl naphthalene | 25 |
| Methyl quinoline | 1 |
| Diphenyl | 10 |
| Naphthols | 15 |
| Fuorene | 10 |
| Phenanthrene | 10 |
| Anthracene | 5 |
| Acridine | 5 |
| Carbozole | 2 |

This mixture is a liquid at room temperature and has a viscosity of about 7.57 centistokes at 70° F. and a specific gravity of about 1.08 at 70° F. Other coal tar distillation compounds having boiling points in the temperature range of about 408° F. to about 666° F. may be present in trace quantities.

Still another example of a coal tar base fluid which provides satisfactory results in accordance with the present invention is one commercially marketed under the trade name Reilly Arcut Plasma C. This fluid is composed of a mixture of coal tar distillation products which boil between about 491° F. to about 513° F. The distillation products in Reilly Arcut Plasma C primarily are polycyclic organic compounds, the mixture of which has an average carbon-to-hydrogen atom ratio of about 1.15. The major components of this fluid are dimethyl naphthalenes. Also present are smaller amounts of diphenyl, 1-methyl isoquinoline, 2,8-dimethyl quinoline, 7-methyl quinoline, 6-methyl quinoline, 3-methyl quinoline with trace quantities of 7,3-dimethyl isoquinoline, 5-methyl quinoline and 4-methyl quinoline. This fluid is a liquid at room temperature and has a viscosity of about 2.84 centistokes at 70° F. and a specific gravity of about 1.04 at 70° F.

As previously mentioned, we have found that fluids consisting essentially of individual polycyclic organic compounds or mixtures thereof which are derived from coal tar, when used as dielectric coolants in an EDM process in accordance with the present invention, improve the workpiece or anode metal removal rates and anode-to-cathode wear ratio to a degree not heretofore realized with aliphatic or monocyclic aromatic hydrocarbon coolants. Comparison tests demonstrating these improvements have been conducted using a machining technique and apparatus substantially as described above. A steel workpiece and a copper cathode were employed with a power input of about four kilowatts at a frequency of about 3000 cycles per second to achieve satisfactory cutting conditions and a fine surface finish. The results of these tests are listed in Table II below, which compares the workpiece metal removal rates and the anode-to-cathode wear ratios obtained under the identical test conditions with Reilly Arcut Plasma A, Reilly Arcut Plasma B, Reilly Arcut Plasma C, deodorized kerosene and dodecyl benzene.

TABLE II

| Dielectric Fluid | Reilly Arcut Plasma | | | Deodorized Kerosene | Dodecyl Benzene |
| --- | --- | --- | --- | --- | --- |
| | A | B | C | | |
| Workpiece metal removal rate in inches³/hr | 4.5 | 4.2 | 4.0 | 1.7 | 2.1 |
| Wear ratio in inches³ loss at anode per inches³ loss at cathode | 9 | 8.3 | 7.9 | 3.3 | 3.9 |
| Carbon-to-hydrogen atomic ratio of fluid | 1.35 | 1.21 | 1.15 | .32 | .60 |

From the foregoing, it will be noted that EDM performance is substantially improved by using dielectric fluids consisting essentially of polycyclic organic compounds having a high carbon-to-hydrogen atom ratio.

Tests also have been conducted to demonstrate the advantages obtained in EDM processes by using dielectric fluids or coolants composed of mixtures of the dielectric fluids of the present invention and other commonly used compatible dielectric fluids, such as kerosene. These tests have shown that adding the dielectric fluids of the present invention to such conventional EDM fluids improves the workpiece consumption rate and the anode-to-cathode wear ratio. For example, Table III below shows the improvements obtained in the EDM performance of deodorized kerosene by using a mixture designated "Product A" which consists, by weight, of about 70% deodorized kerosene and 30% Reilly Arcut Plasma B under the test conditions previously described in reference to the comparison test results listed in Table II.

TABLE III

| Dielectric Fluid | Deodorized Kerosene | Product A |
| --- | --- | --- |
| Workpiece metal removal rate in inches³/hr | 1.7 | 3.0 |
| Wear ratio in inches³ loss at anode per inches³ loss at cathode | 3.3 | 4.7 |

Generally, organic dielectric fluids containing relatively large proportions of the polycyclic organic compounds of the present invention will significantly improve EDM performance, since the average carbon-to-hydrogen atomic ratio of such fluids is greater than in those fluids heretofore used commercially. Thus, tests have shown that the EDM performance of the polycyclic organic dielectric fluids of the present invention will not be substantially affected by the addition of small quantities of compatible organic substances containing chemically bonded oxygen, nitrogen and sulfur atoms. Hence, compatible viscosity improvers might be added to the dielectric fluids of the present invention. However, the presence of the foreign organic substances preferably should not exceed about 5%, by weight, of the total fluid so that the EDM performance of the dielectric fluids of the present invention is not substantially affected.

In addition to the previously mentioned polycyclic organic EDM fluids derived from coal tar, we have found that fluids consisting of polycyclic organic molecules produced synthetically or derived from other sources and having a carbon-to-hydrogen atomic ratio between about 0.8 to 1.8 may be utilized in accordance with the present invention to provide improvements in the workpiece metal removal rate and the anode-to-cathode wear ratio of an EDM process. For example, we have found that a fluid mixture of polycyclic aromatic compounds commercially marketed under the trade name "Santowax DOM" provides particularly satisfactory results when used in an EDM process. This fluid is a tertiary eutectic mixture consisting, by weight, of about 25% biphenyl, about 55% ortho-terphenyl and about 20% meta-terphenyl. This eutectic mixture melts at about 51° F. and boils at about 568° F. and has a viscosity of about 6.5 centistokes at 100° F. The carbon-to-hydrogen atomic ratio of this mixture is about 1.26.

Also, other fluids consisting of mixture of polycyclic organic molecules such as biphenyls, terphenyls and higher molecular weight polycyclic molecules containing phenyl groups and having a carbon-to-hydrogen atomic ratio between about 0.8 to about 1.8 may be utilized in accordance with the present invention to achieve the aforementioned improvements in EDM processes. Of course, as previously mentioned, these fluids which may consist of one or more polycyclic organic compounds preferably should have a sufficiently low viscosity and melting point to facilitate their use in an EDM process. However, it has been found that many of the higher molecular weight polycyclic organic molecules and particularly those containing phenyl groups must be hydrogenated to reduce the crystal point of these fluids to prevent plugging of the EDM gap with crystal particles.

Naturally, hydrogenation of the fluids will reduce the overall carbon-to-hydrogen atomic ratio of the fluids. However, if the fluid can be hydrogenated to a sufficient degree to reduce the crystal point to a suitably low temperature level without reducing the carbon-to-hydrogen atomic ratio below a minimum of about 0.8, the aforementioned improvements in EDM processes may be realized.

Moreover, polycyclic organic fluids such as those containing polycyclic aromatic molecules have a relatively high viscosity. Consequently, it may be necessary to add a compatible solvent to certain high viscosity polycyclic organic fluids in order to reduce the viscosity of the fluids to a suitable level for use in an EDM process. Of course, the addition of the solvent preferably should not lower the overall carbon-to-hydrogen atomic ratio of the mixture below a minimum of about 0.8 so that the aforementioned improvements in an EDM process may be attained.

A specific example of a dielectric fluid which may be utilized in accordance with the present invention to provide improved workpiece metal removal rate and anode-to-cathode wear ratio in an EDM process is a hydrogenated mixture of polycyclic aromatic compounds which is commercially marketed by Monsanto Chemical Company as "MCS-160." This product is believed to contain, by weight, about 30% biphenyl, about 50% mixed terphenyls and about 20% higher molecular weight molecules containing phenyl groups, the entire mixture of which is hydrogenated to obtain a carbon-to-hydrogen atomic ratio of about 0.93 and a crystal point of about 40° F. In general, the crystal point of the dielectric EDM fluid preferably should not exceed about 50° F. This hydrogenated mixture has a specific gravity of about 1.01 at 77° F. and a viscosity of about 10.7 centistokes at 100° F.

In certain EDM applications where a lower viscosity fluid is desired, the viscosity of the MCS-160 fluid may be reduced by adding about 17%, by weight, of liquid tetrahydronaphthalene to reduce the viscosity of the fluid to about 6.5 centistokes at 70° F. and the specific gravity to about 1.00 at 77° F. The workpiece metal removal rate and the anode-to-cathode wear ratio of the EDM process is not appreciably affected by this addition, since the overall carbon-to-hydrogen atomic ratio of the fluid mixture is reduced only to about 0.91. Of course, other compatible viscosity reducing additives also might be used.

Table IV below shows the improvements obtained in EDM performance using Santowax DOM, MCS-160 and a mixture consisting, by weight, of about 83% MCS-160 and about 17% tetrahydronaphthalene in comparison to the performance of deodorized kerosene and dodecyl benzene under the same test conditions previously described in reference to the comparison test results listed in Table II.

TABLE IV

| Dielectric Fluid | Workpiece Metal Removal Rate in Inches³/hour | Wear Ratio in Inches³ Loss at Anode per Inches³ Loss at Cathode |
|---|---|---|
| Santowax DOM | 4.2 | 8.5 |
| MCS-160 | 2.9 | 5.8 |
| Mixture, by weight, of 83% MCS-160 and 17% tetrahydronaphthalene | 2.8 | 5.7 |
| Dodecyl benzene | 2.1 | 3.9 |
| Deodorized kerosene | 1.7 | 3.3 |

From the foregoing it will be noted that EDM performance is substantially improved by using a dielectric fluid having a carbon-to-hydrogen atomic ratio of about 0.8 to about 1.8 and consisting essentially of polycyclic organic compounds, such as one or more of the group of compounds including biphenyl, terphenyl and other polycyclic aromatic compounds. Also, as in the case of the polycyclic organic coal tar derivatives, we have found that polycyclic organic compounds such as biphenyl, terphenyl and other polycyclic aromatic compounds may be used in mixtures with other commonly used compatible dielectric fluids, such as dodecyl benzene, to improve the EDM performance of the latter fluids. In addition, as previously mentioned, compatible organic additives, such as viscosity improvers, may be added to these fluids in many cases without substantially affecting the EDM performance of the fluids.

While this invention has been described and exemplified in terms of certain preferred embodiments, those skilled in the art will appreciate that modifications can be made without departing from the scope of the invention as defined in the appended claims.

We claim:

1. A method of eroding particles from an electrically conductive anodic article by electrical discharge which comprises causing intermittent electrical discharge across a gap between a cathode and an anode while maintaining in said gap a fluid consisting essentially of at least one polycyclic organic compound, said compound having a carbon-to-hydrogen atomic ratio of about 0.8 to about 1.8.

2. A method of electrical discharge machining which comprises causing intermittent electrical discharge across a gap between a cathodic electrode and an anodic workpiece while maintaining in said gap a fluid consisting essentially of at least one polycyclic organic compound, said compound having a carbon-to-hydrogen atomic ratio of about 0.8 to about 1.8.

3. The method of electrical discharge machining which comprises causing intermittent electrical discharge across a gap between a cathode and an anode while maintaining in said gap a coolant consisting essentially of at least one polycyclic organic compound derived from coal tar, said compound having a carbon-to-hydrogen atomic ratio of about 0.8 to about 1.8.

4. The method of electrical discharge machining which comprises causing intermittent electrical discharge across a gap between an electrode and a workpiece while maintaining in said gap a dielectric coolant consisting essentially of a mixture of fused ring organic compounds and other polycyclic aromatic compounds, said mixture being derived from coal tar and having an overall carbon-to-hydrogen atomic ratio of about 0.8 to about 1.8.

5. The method of electrical discharge machining which comprises causing intermittent electrical discharge across a gap between an electrode and a workpiece while maintaining in said gap a dielectric fluid, said fluid consisting essentially of a mixture of polycyclic organic compounds derived from coal tar, said mixture having an overall carbon-to-hydrogen atomic ratio of about 0.8 to about 1.8, said compounds having boiling points in a temperature range of about 392° F. to about 842° F.

6. The method of electrical discharge machining which comprises causing intermittent electrical discharge across a gap between an electrode and a workpiece while maintaining in said gap a dielectric coolant, said coolant consisting essentially of a mixture of fused ring organic compounds and other polycyclic aromatic compounds derived from the fractional distillation of coal tar, said mixture having an overall carbon-to-hydrogen atomic ratio of about 0.8 to about 1.8, said compounds having boiling points in a temperature range of about 408° F. to about 745° F.

7. The method of electrical discharge machining which comprises causing intermittent electrical discharge across a gap between an electrode and a workpiece while maintaining in said gap a liquid dielectric coolant bath, said bath having an overall carbon-to-hydrogen atomic ratio of about 0.8 to about 1.8 and consisting essentially of a mixture of fused ring organic compounds and other polycyclic aromatic compounds derived from coal tar, said compounds having boiling points in a temperature range of about 408° F. to about 666° F.

8. A method of electrical discharge machining which comprises causing intermittent electrical discharge across a gap between an electrode and a workpiece while maintaining in said gap a dielectric coolant bath, said bath comprising a mixture of liquid polycyclic organic coal tar distillation products and a compatible liquid dielectric hydrocarbon fluid, said products having an overall carbon-to-hydrogen atomic ratio of about 0.8 to about 1.8.

9. The method of electrical discharge machining which comprises causing intermittent electrical discharge across a gap between an electrode and a workpiece while maintaining in said gap a liquid dielectric bath, said bath comprising a mixture of polycyclic organic coal tar distillation products and small but effective amounts but not more than about 5%, by weight, of a compatible viscosity reducer, said distillation products having boiling points in the temperature range varying from about 408° F. to about 745° F.

10. A method of electrical discharge machining which comprises causing intermittent electrical discharge across a gap between a cathodic electrode and an anodic workpiece while maintaining in said gap a liquid coolant, said coolant consisting essentially of at least one of polycyclic organic compounds having a plurality of phenyl radicals, said coolant having an overall carbon-to-hydrogen atomic ratio of about 0.8 to about 1.8.

11. A method of electrical discharge machining which comprises causing intermittent electrical discharge across a gap between an electrode and a workpiece while maintaining in said gap a liquid mixture of polycyclic organic compounds, said mixtures consisting essentially of biphenyl, ortho-terphenyl and meta-terphenyl.

12. A method of electrical discharge machining which comprises causing intermittent electrical discharge across a gap between an electrode and a workpiece while maintaining in said gap a liquid mixture of polycyclic organic compounds comprising biphenyl, mixed terphenyls and higher molecular weight polycyclic compounds having phenyl radicals, said mixture being hydrogenated to reduce the crystal point to a temperature of no more than 50° F. and having an overall carbon-to-hydrogen atomic ratio of about 0.8 to about 1.8.

13. A method of electrical discharge machining which comprises causing intermittent electrical discharge across a gap between an electrode and a workpiece while maintaining in said gap a liquid coolant, said coolant comprising a mixture of polycyclic organic compounds having phenyl radicals and a compatible organic solvent to reduce the viscosity of said mixture to no more than about 100 centistokes at 70° F., said mixture having an overall carbon-to-hydrogen atomic ratio of about 0.8 to about 1.8.

14. A method of electrical discharge machining which comprises causing intermittent electrical discharge across a gap between an electrode and a workpiece while maintaining in said gap a liquid coolant composed of polycyclic organic compounds comprising tetrahydronaphthalene as a viscosity reducing solvent and a hydrogenated mixture of polycyclic aromatic compounds, said hydrogenated mixture comprising, by weight, about 30% biphenyl, 50% terphenyls and about 20% of higher molecular weight polycyclic aromatic compounds, the overall carbon-to-hydrogen atomic ratio of said coolant ranging from about 0.8 to about 1.8.

15. The method of electrical discharge machining, which comprises causing intermittent electrical discharges across a gap between an electrode and a workpiece while maintaining in said gap a dielectric fluid, said fluid consisting essentially of a mixture of fused ring organic compounds and other polycyclic aromatic compounds derived from the fractional distillation of coal tar, said mixture having an overall carbon-to-hydrogen atomic ratio of about 0.8 to about 1.8, said compounds having boiling points in a temperature range of about 491° F. to about 513° F.

References Cited
UNITED STATES PATENTS

| | | |
|---|---|---|
| 1,856,700 | 5/1932 | Ford. |
| 2,730,602 | 1/1956 | Porterfield _____ 219—69 |
| 3,084,245 | 4/1963 | Tardy et al. _____ 219—69 |

OTHER REFERENCES

"Stabilization of Dielectrics," H. A. Sauer et al., Industrial and Engineering Chem., January 1952, pp. 135–140.

"Gassing of Liquid Dielectrics," H. Basseches et al., Industrial and Engineering Chem., September 1955, pp. 1782, 1787, 1793.

ANTHONY BARTIS, *Primary Examiner.*

RICHARD M. WOOD, *Examiner.*

R. F. STAUBLY, *Assistant Examiner.*